United States Patent [19]

Sounai et al.

[11] Patent Number: 4,554,225
[45] Date of Patent: Nov. 19, 1985

[54] MOLTEN CARBONATE FUEL CELL

[75] Inventors: Atuo Sounai, Yokohama; Kenji Murata, Tokyo, both of Japan

[73] Assignee: Tokyo Shibaura Denki Kabushiki Kaisha, Kawasaki, Japan

[21] Appl. No.: 594,980

[22] Filed: Mar. 29, 1984

[30] Foreign Application Priority Data

Mar. 31, 1983 [JP] Japan .................................. 58-55998
May 24, 1983 [JP] Japan .................................. 58-91013

[51] Int. Cl.⁴ ............................................ H01M 8/14
[52] U.S. Cl. ...................................... 429/34; 429/41; 429/16; 429/45
[58] Field of Search ................. 429/34, 41, 39, 40, 429/45, 103, 112, 16

[56] References Cited

U.S. PATENT DOCUMENTS

| | | | |
|---|---|---|---|
| 2,914,596 | 11/1959 | Gorin | 429/34 |
| 3,331,706 | 7/1967 | Moubray | 429/30 |
| 3,481,788 | 12/1969 | Hamlen et al. | 429/45 |
| 3,544,373 | 12/1970 | Swinkels | 429/16 X |
| 3,953,237 | 4/1976 | Epstein | 429/41 |
| 4,007,058 | 2/1977 | Nelson et al. | 429/34 |
| 4,476,199 | 10/1984 | Takeuchi et al. | 429/34 |

FOREIGN PATENT DOCUMENTS 954934  9/1974 Canada .
1246135 10/1960 France .

OTHER PUBLICATIONS

"Hochtemperatur-Naturgas-Brennstoffelemente", and Advance Chem. Ser. No. 47, 247-61, 1965, Chem Zentralblatt, Nov. 17, 1966, p. 5531, No. 0504; B. S. Baker et al.
"Molten Carbonate Fuel Cell Systems-Status and Potential", p. 992, lines 5-7, Extended Abstracts, vol. 77-1, Spring Meeting, May 8-13, 1977, Pennsylvania, pp. 992-993, Abstract No. 391; J. P. Ackerman.

*Primary Examiner*—Anthony Skapars
*Attorney, Agent, or Firm*—Oblon, Fisher, Spivak, McClelland & Maier

[57] ABSTRACT

In a molten carbonate fuel cell wherein a cathode and an anode of porous material formed in contact with an electrolyte layer, each of the cathode and anode comprises a bilayered structure having a first porous layer located at the side of the electrolyte layer and a second porous layer at the side of an element for supplying a fuel (or oxidant) gas and consisting of a sintered layer of a fibrous material. Pores in at least a portion of the first porous layer, which is adjacent to the electrolyte layer, have a size allowing capillary action of a molten carbonate, and pores of the second porous layer have a size not allowing capillary action.

6 Claims, 4 Drawing Figures

MOLTEN CARBONATE FUEL CELL

BACKGROUND OF THE INVENTION

The present invention relates to a molten carbonate fuel cell and, more particularly, to a molten carbonate fuel cell wherein an anode and a cathode are formed in contact with an electrolyte layer containing a carbonate and are porous layers, and the supply of reactive gas and the discharge of reaction products are performed through small pores in these electrodes.

When a gas which can be easily oxidized, such as hydrogen gas, and a gas which has a strong oxidizing power, such as oxygen, are reacted through an electrochemical reaction process, DC power can be generated. A fuel cell realizes such a reaction process.

Fuel cells are roughly classified based on the type of electrolyte used in fuel cells of phosphoric acid, molten carbonate, and solid electrolyte type. Of these types, molten carbonate fuel cells are operated at a temperature around 650° C. Molten carbonate fuel cells do not require the use of a noble metal as catalyst, allow the use of carbon monoxides in place of hydrogen as fuel, have a relatively high voltage generated per unit cell, and allow utilization of high-temperature waste energy.

Such a molten carbonate fuel cell generally consists of a plurality of stacked unit cells. Output voltage from each unit cell is at best about 1 V. Thus, in order to obtain a practical cell, a plurality of such unit cells must be electrically connected in a series.

Each unit cell of such a molten carbonate fuel cell generally comprises an electrolyte layer in a plate-like form containing: a carbonate, melted at operating temperature; a cathode and an anode, which are formed in tight contact to sandwich the electrolyte layer and which comprise plates of porous material; an element for supplying fuel gas to the interface between the cathode and the electrolyte layer through pores in the cathode; and another element for supplying an oxidant gas to the interface between the anode and the electrolyte layer through pores in the anode. The elements for supplying the fuel and oxidant gases comprise a plurality of gas guide grooves, defined between those surfaces of conductive interconnectors inserted between each adjacent unit cells and which contact the unit cells when such unit cells are stacked. Gas guide grooves for guiding the fuel gas and those for guiding the oxidant gas are formed perpendicularly to each other, so as to allow each connection access to sources of the respective gases. The fuel gas guided by such gas guide grooves is diffused in the cathode in its direction of thickness toward the electrolyte layer. On the other hand, the oxidant gas guided through the corresponding gas guide grooves is diffused through the anode in its direction of thickness toward the electrolyte layer.

In a molten carbonate fuel cell of the type described above, the output characteristics are largely dependent on the structure and characteristics of the anode and cathode. In order that a molten carbonate fuel cell has stable output characteristics over a long period of time, the anode and cathode must satisfy the following requirements: the anode and cathode are chemically stable against a molten carbonate at a temperature of 600° to 700° C., have a capacity of guiding the fuel gas and oxidant gas to the reaction site through internal pores, are capable of sustaining guide paths of gases over a long period of time, of guiding the molten carbonate to the reaction site, of stably sustaining the guide path of the molten carbonate, have good electron conductivity, can reduce the contact resistance with the electrolyte layer or the interconnector, and have a large specific surface area so as to have a large number of three-phase surfaces (reaction points) where the electrodes, the reactive material, and carbonate ions are all present.

In view of these requirements, in a conventional molten carbonate fuel cell, a cathode and an anode comprise porous plates, which are obtained by sintering a nickel-based alloy powder to have a narrow pore size distribution.

When a cathode and anode of a material having a large average pore size, for example, 20 $\mu$m or more, are used to stably supply the fuel and oxidant gases, the pressure of the supplied gas is applied to the electrolyte layer. This may reduce the number of reaction points. Then, output density cannot be improved. On the other hand, when a cathode and anode of a porous material having a small average pore size, for example, 2 $\mu$m or less, are used to provide a large number of reaction points, the molten carbonate is guided toward the gas guide grooves by capillary action through the electrodes. Then, in this case, the electrolyte cannot be stably sustained. Furthermore, in this case, the electrolyte which has permeated into the pores results in an increase in the diffusion resistance of the gas, so that supply of reactive gas is prevented.

In order to solve these problems, an electrode has been proposed which comprises a sintered porous plate of a powdery material, wherein the average pore size is small toward the electrolyte layer and is large toward the gas supply side. When a cathode and anode of such a structure are assembled, pores having different sizes in the direction of thickness serve well to improve the output density and to sustain the electrolyte over a long period of time.

However, when a powdery material is sintered to form a porous electrode, the electrode has a porous structure wherein the points of powder particles contact each other. For this reason, when the porosity is set to be 50% or more, the electron conductivity is decreased and a voltage drop between the cathode or anode is increased. In addition, a porous electrode of such a structure has low mechanical strength and elasticity. The electrode may be broken due to stress applied by a shrinkage difference between the electrode and electrolyte layer when the cell temperature is decreased. The contact between the electrode and the interconnector may be made non-uniform to increase the contact resistance at this portion.

SUMMARY OF THE INVENTION

It is an object of the present invention to provide a molten carbonate fuel cell which can be operated at a high output density over a long period of time and which allows reduction in the internal resistance of the cell.

In order to achieve the above object of the present invention, there is provided a molten carbonate fuel cell comprising unit cells each having an electrolyte layer in a plate-like form which contains a carbonate melted at an operating temperature, a cathode and an anode which are formed in tight contact to sandwich the electrolyte layer and which comprise plates of porous material, an element for supplying fuel gas to the interface between the cathode and the electrolyte layer through pores in the cathode, and another element for supplying an oxidant gas to the interface between the anode and the electrolyte layer through pores in the anode.

In a molten carbonate fuel cell having such a structure, each cathode and anode of the cell in this invention comprises a bilayered structure having a first porous layer formed in contact with the electrolyte layer, and a second porous layer formed at the side of the element for supplying fuel (or oxidant) gas and consisting of a sintered fibrous material. Of the pores formed in the first porous layer, at least the pores near the electrolyte layer are formed to have a size allowing capillary action of the molten carbonate to pass through. In addition to this, the pores of the second porous layer are formed to have a size which does not allow capillary action to pass through.

In a molten carbonate fuel cell of the present invention, each cathode and anode of a unit cell has a bilayered structure of first and second porous layers. The first porous layer of each cathode and anode is in contact with the electrolyte layer, and the second porous layer thereof is in contact with the gas supply element, that is, the interconnector. The second porous layer comprises a sintered layer of a fibrous material. Since a porous body, obtained by sintering an electrically conductive fibrous material, has a large contact area between fibers, it has an extremely high electron conductivity as compared to a porous body obtained by sintering a powdery material. Thus, the voltage drop between the cathode or anode can be reduced. A porous body obtained by sintering a fibrous material has high mechanical strength in the lateral direction and good elasticity. When a cathode or anode comprises such a porous body, its mechanical strength can be improved and the contact resistance with the interconnector can be significantly reduced. In this manner, according to the present invention, the voltage drop between the electrodes or between the electrode and the interconnector can be reduced. In addition to this, damage to the electrodes, generally caused by a difference in shrinkage between the electrodes and the electrolyte when the temperature of the cell is lowered, can be prevented. The electrolyte can be sustained over a long period of time, and the output density can be improved. In operation, the molten carbonate permeates into the first porous layer and tends to move toward the second porous layer in both the cathode and anode. However, the second porous layer does not allow capillary action. Furthermore, the pores of the second porous layer are in contact with the supply source of the reactive gas. For this reason, the permeated carbonate only permeates to a position where the permeating power of the carbonate by capillary action balances the gas pressure acting through the pores of the second porous layer. The permeated carbonate is then stabilized. No compression force acts on the molten carbonate in the electrolyte layer, and no force acts to transfer the molten carbonate into the path of the reactive gas through the pores of the cathode and anode. The molten carbonate is therefore stably sustained over a long period of time, and the cell life is prolonged.

Since the second porous layer has a large pore size, it contributes to decrease the diffusion resistance of the reactive gas. Meanwhile, since the first porous layer has a small pore size and has the molten carbonate permeated therein, it contributes to increase the number of reaction points, that is, a specific surface area. Thus, the output density is improved.

DETAILED DESCRIPTION OF THE PREFERRED EMBODIMENT

Figure 1:
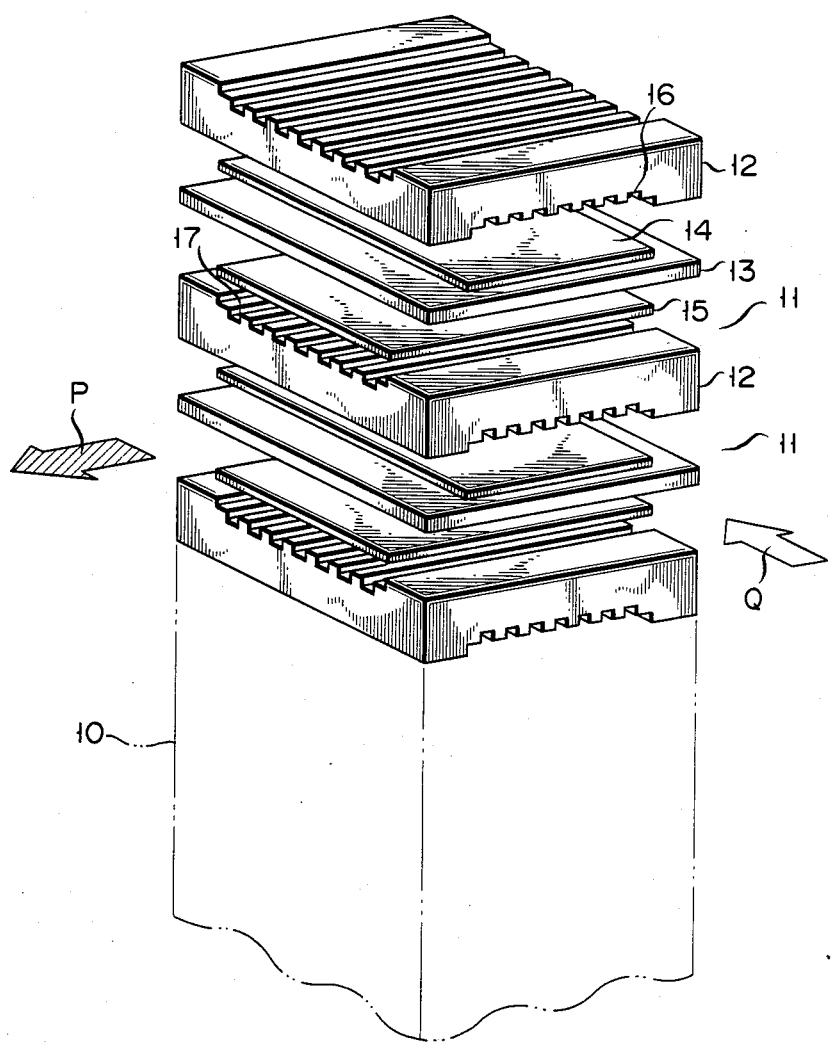
FIG. 1 is an exploded perspective view showing the main part of a molten carbonate fuel cell according to an embodiment of the present invention.

FIG. 1 shows a main section 10 of a molten carbonate fuel cell of the present invention. The main section 10 comprises a stacked body consisting of a plurality of unit cells 11 with an interconnector 12 inserted between each pair of unit cells 11.

Each unit cell 11 consists of an electrolyte layer 13 of a plate-like shape, a cathode 14 and an anode 15 of plate-like shape formed in contact with the surfaces of the electrolyte later 13, and a plurality of gas guide grooves 16 and 17, formed in the surfaces of the interconnector 12, which contact with the cathode 14 and the anode 15, respectively.

The electrolyte layer 13 comprises a plate having a thickness of, for example, 2 mm and formed by hot pressing at 450° C. a mixture consisting of, for example, 60% by weight of a carbonate and 40% by weight of a ceramic-type binder.

Figure 2:
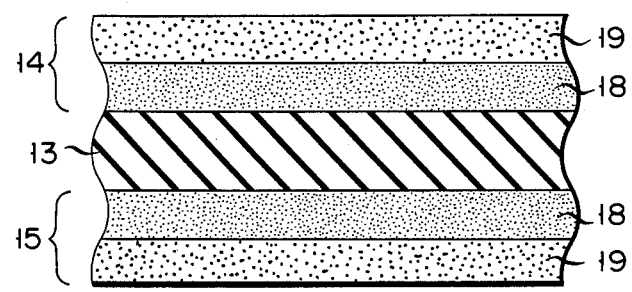
FIG. 2 is a cross-sectional view of the main part of a unit cell used in the cell shown in FIG. 1.

The cathode 14 and anode 15 comprise porous bodies having a thickness of, for example, 1 mm. More specifically, each of the cathode 14 and anode 15 comprises a bilayered structure having a first porous layer 18, formed at the side of the electrolyte layer 13, and a second porous layer 19, formed at the opposite side, as shown in FIG. 2. The first porous layer 18 comprises a sintered body of a fibrous or powdery nickel or nickel-chromium alloy. The first porous layer 18 has a pore size to allow capillary action of the molten carbonate, such as a pore size of 0.3 to 20 $\mu$m, a porosity of 60 to 80%, and a thickness of 0.3 mm. The second porous layer 19 comprises a sintered body of a fibrous nickel or nickel-chromium alloy. The second porous layer 19 has a pore size not to allow capillary action of the molten carbonate, such as a pore size of 21 to 50 $\mu$m, a porosity of 60 to 80%, and a thickness of 0.7 mm.

Each interconnector 12 consists of stainless steel which is chemically inert against the carbonate. The gas guide grooves 16 and 17, formed on the two surfaces of each interconnector 12, are perpendicular to each other. The surface portion of the interconnector 12, in which the grooves 16 or 17 are formed, is recessed at a depth corresponding to the thickness of the cathode 14 or anode 15. Therefore, when the cathode 14 or anode 15 is fitted with the corresponding surface of the interconnector 12, the surface of the cathode 14 or anode 15 in contact with the electrolyte layer 13 is coplanar with the peripheral portion of the same surface of the interconnector 12.

The main section 10, comprising a stacked body of unit cells 11 and interconnectors 12, is fastened with a fastening mechanism (not shown) in the stacking direction. Manifolds (not shown) for supplying the supply gas are hermetically attached to the four sides of the stacked body. In order to cause the actual electromotive reaction, an electrical load is connected across the stacked body, which is heated to a temperature at which the carbonate in the electrolyte layer 13 is molten. Subsequently, an oxidant gas flows to the gas guide grooves 17 through the corresponding manifolds in the direction indicated by the thick broken arrow P shown in FIG. 1. At the same time, fuel gas is also supplied to the gas guide grooves 16 through the corresponding manifolds in the direction indicated by thick arrow Q.

Part of the fuel gas flowing through the gas guide grooves 16 is diffused in the pores of the cathode 14 and reaches the reaction points at which the cathode 14 and the carbonate meet. Likewise, part of the oxidant gas, flowing through the gas guide grooves 17, is diffused in the pores of the anode 15 to reach the reaction points at which the anode 15 and the carbonate meet. The electromotive reaction is thus effected.

In the molten carbonate fuel cell of the present invention, each of the cathode 14 and anode 15, as the constituent elements of each unit cell 11, comprises a bilayered structure of first and second porous layers 18 and 19. The pore size of the first porous layer 18, located at the side of the electrolyte later 13, is set to allow capillary action of the molten carbonate. On the other hand, the pore size of the second porous layer 19, located at the opposite side, is set to not allow such capillary action. Thus, the carbonate which has permeated through the first porous layer 18 can permeate only to a position at which the permeating force of the capillary action is balanced by the gas pressure acting through the pores of the second porous layer 19, and it is stabilized at such a position. For this reason, no compression or suction force acts on the molten carbonate in the electrolyte layer 13. Loss of the carbonate is smaller than in the case where the carbonate is subject to such a compression or suction force. The carbonate can be sustained for a long period of time, and the cell life can be prolonged. Since the first porous layer 18 has a small pore size and contains the molten carbonate permeated therein, the specific surface area can be increased. On the other hand, the second porous layer 19 has a large pore size and can satisfactorily reduce the diffusion resistance of the reactive gas. As a consequence, the number of reaction points can be increased, and a sufficient amount of the reaction gas can be supplied to these reaction points, so that the output density can be improved. When the permeating power of the molten carbonate is properly set by suitably selecting the pore size of the first porous layer 18, the bubble pressure can be improved by about 50% compared to a conventional case, and this serves to prevent intermixing of the fuel and oxidant gases. This simplifies the supply of the reaction gas and improves safety. The second porous layer 19 located at the side of the interconnector 12 comprises a sintered body of an electrically conductive fibrous material. A porous body obtained by sintering a fibrous material has a higher mechanical strength and elasticity than that of a porous material obtained by a powdery material and has a lower electrical resistance in the direction of thickness than that of the latter. The presence of the second porous layer 19 prevents damage of the cathode 14 and anode 15 due to the heating/cooling cycle and reduces the voltage drop between the electrodes and between the electrode and interconnector.

The present invention will now be described by way of examples to demonstrate the effects thereof.

EXAMPLE 1

Three parts of a fibrous metal consisting of $Ni_{(80)}$-$Cr_{(20)}$, having an average diameter of 25 $\mu$m and an aspect ratio of 4 or more, were charged into a former. On part of a fibrous metal consisting of $Ni_{(80)}$-$Cr_{(20)}$, having an average diameter of 4 $\mu$m and an aspect ratio of 4 or more, was charged onto the former metal portion. The metals were formed into a plate. The plate was placed in an $H_{2(20)}$-$N_{2(80)}$ gas atmosphere and was sintered at 850° C. for 1 hour. A porous body of $Ni_{(80)}$-$Cr_{(20)}$ was thus obtained. The porous body was microscopically observed in a section along the direction of its thickness. A layer of the fibrous metal having the diameter of 25 $\mu$m (second porous layer) had a pore size of 22 to 30 $\mu$m, which does not cause capillary action, and a porosity of 75%. A layer of the fibrous material having the diameter of 4 $\mu$m (first porous layer) had a pore size of 2 to 5 $\mu$m, which easily causes capillary action, and a porosity of 75%.

Mechanical tests of the porous body revealed that the porous body had tensile strength, softness, and surface smoothness which were satisfactory for a gas diffusion electrode of a fuel cell.

Separately, three parts of a fibrous metal Ni having an average diameter of 30 $\mu$m and one part of a fibrous metal Ni having an average diameter of 8 $\mu$m were charged into a former in a layered form. The metals were formed into a plate. The plate was sintered in an $H_{2(20)}$-$N_{2(80)}$ gas atmosphere at 820° C. for 1 hour to provide an Ni porous body. The Ni porous body was microscopically observed in a section along the direction of its thickness. The following results were obtained. A layer of the fibrous metal having the average diameter of 30 $\mu$m (second porous layer) had a pore size of 25 to 35 $\mu$m and a porosity of 70%. A layer of the fibrous metal having the average diameter of 8 $\mu$m (first porous layer) had a pore size of 8 to 12 $\mu$m and a porosity of 70%. The ratio of the thickness of the first and second porous layers was about 1.0:3.2.

The $Ni_{(80)}$-$Cr_{(20)}$ porous body and the Ni porous body thus prepared separately were placed on two sides of an electrolyte layer such that the $Ni_{(80)}$-$Cr_{(20)}$ porous body was used as a cathode and the Ni porous body was used as an anode, and each first porous layer faced the electrolyte layer. A fuel cell was thus assembled. The electrolyte layer was obtained by hot pressing at 450° C. and by forming a mixture of 60% by weight of a carbonate and 40% by weight of a ceramic as a binder.

Figure 3:
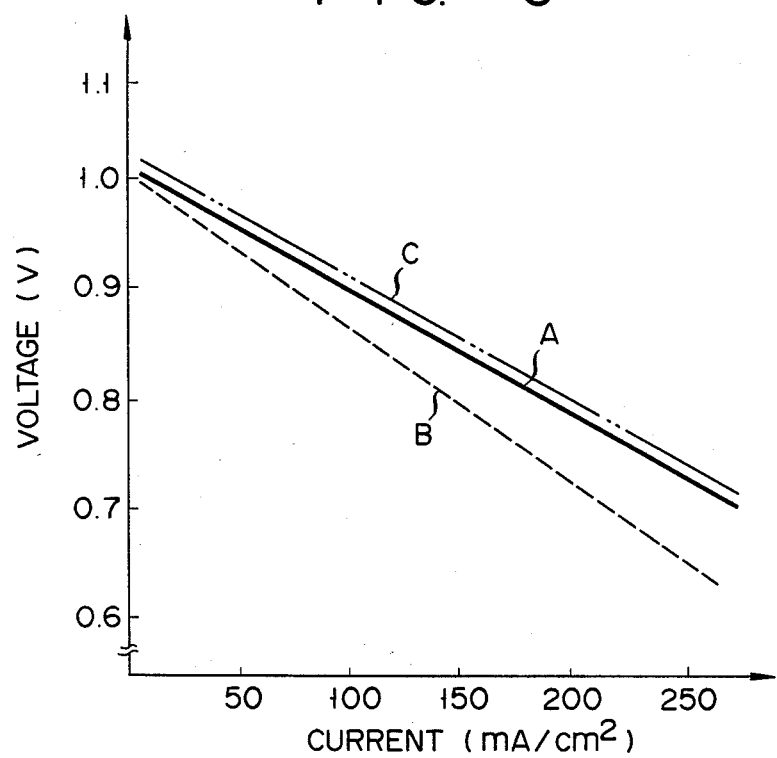
FIG. 3 is a graph showing output voltage-output current characteristics of a molten carbonate fuel cell of the present invention compared with those of a conventional cell.

FIG. 3 shows a current-voltage characteristic curve A of the fuel cell prepared in this manner together with that B of a fuel cell having as gas diffusion electrode porous bodies of a conventional structure. As can be seen from FIG. 3, the cell of the present invention has better characteristics than those of the cell of a conventional structure. This fact indicates that in the cell of the present invention when the pore size in the second porous layer, located at the gas supply side, is large, the supply of the reactive gas can be performed satisfactorily.

Figure 4:
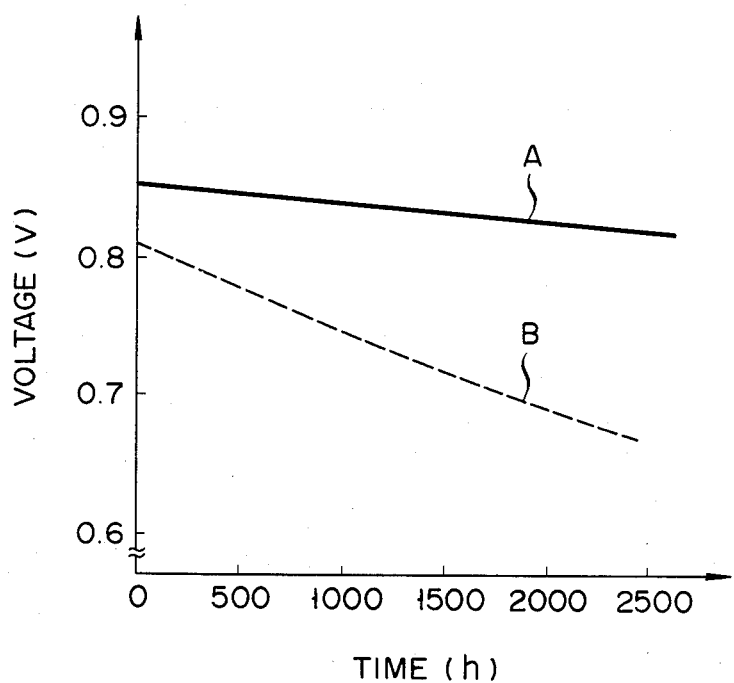
FIG. 4 is a graph showing changes in output voltages against time of the molten carbonate fuel cell of the present invention together with those of the conventional cell.

FIG. 4 shows changes in output voltage of the cell during operation over an extended period of time. Curve A corresponds to a cell of the present invention, and curve B corresponds to a cell of conventional structure. As can be seen from FIG. 4, the fuel cell of the present invention can stably provide the electromotive reaction over a long period of time. This also indicates that the electrolyte is stably held by the cathode and anode, demonstrating that the first porous layers having a small pore size are serving their original purpose.

The cell prepared in the manner described above was subjected to a plurality of heat cycles each comprising heating from room temperature to the operating temperature and cooling back to room temperature again. The cell exhibited no abnormality in the cathode and anode.

EXAMPLE 2

A fibrous metal of an $Ni_{(80)}\text{-}Cr_{(20)}$ alloy, having a diameter of 2 to 10 $\mu$m and an aspect ratio of 4 or more, was charged in a former in a layered form of 0.5 mm thickness. A powdery metal of an $Ni_{(80)}\text{-}Cr_{(20)}$ alloy, having a size distribution (cumulative volume fraction) of 10 to 90% and a size of 2 to 8 $\mu$m, was placed on the former metal in the same weight. The metals were formed by compression into a plate of 0.8 mm thickness. The plate was sintered in a hydrogen-containing atmosphere at 1,050° C. for 1 hour to provide a bilayered porous electrode. When the electrode was observed under an electron microscope, the sintered layer of powdery material had a pore size of 22 to 30 $\mu$m and the sintered layer of fibrous material had a pore size of 22 to 30 $\mu$m. The former layer had a porosity of 75%, and the latter layer had a porosity of 70%.

Two electrodes each consisting of such sintered layers of powdery and fibrous materials were prepared. An aqueous slurry, containing $NiCO_3$ and methyl cellulose (3% by weight) as a binder, was applied on the sintered layer of powdery material of each electrode. The electrodes were presintered in the air at 500° C. to vaporize the binder and to thermally decompose the nickel carbonate into nickel oxide (NiO). Thereafter, the electrodes were sintered in hydrogen at 1,000° C. for 1 hour to reduce the nickel oxide. Fine powdery layers of 0.05 to 0.2 mm thickness precipitated on the surfaces of the sintered layers of powdery material of the respective electrodes. Thus, electrodes were prepared each having a sintered layer of the powdery material and a fine powder layer as the first porous layer, and a sintered layer of fibrous material as the second porous layer.

The fine powder layers of the two electrodes thus prepared had a porosity of 60 to 80% and a pore size distribution (cumulative volume fraction: 10 to 90%) of 0.3 to 1.5 $\mu$m.

A unit cell was assembled using the two electrodes such that the fine powder layers faced the electrolyte layer, following the same procedures as in Example 1. The unit cell was heated from room temperature to 650° C. at a rate of 50° C./h and was kept at 650° C. The electromotive reaction was performed with a fuel gas having a ratio of air to carbonic acid gas of 8:2 and an oxidant gas having a ratio of air to carbonic acid gas of 7:3. The relationship between the terminal voltage and the current density was examined. The results revealed the characteristics indicated by curve C in FIG. 3. It was confirmed that the fine powder layers of the electrodes caused an improvement of 30% in the bubble pressure, serving to prevent intermixing of the fuel and oxidant gases, over that (curve B) of the conventional case. The bubble pressure of the cell in Example 2 also presented a 15% improvement over that of the cell in Example 1. The cell in Example 2 had a cathode and anode with satisfactory mechanical strength and elasticity which were suitable for electrodes of a molten carbonate fuel cell.

In the Examples described above, the powdery and fibrous materials were nickel or nickel-chromium alloys. However, they need not be limited to these materials. A combination of a metal layer and an electronconductive ceramic layer formed by nonelectrolytic plating, sputtering or chemical vapor deposition on a surface layer of a metal such as nickel-aluminum, nickel-cobalt, or nickel-chromium-cobalt alloy in which chromium, aluminum or cobalt is diffused in its surface layer; a ceramic which has an electron conductivity and is stable against carbonate in a reducing atmosphere, such as titanium carbide or titanium nitride; or a ceramic stable against carbonate, such as lithium aluminate, strontium titanate, lithium zirconate, or lithium titanate may be used.

In Example 2, compression is performed so as to form electrodes. However, fibrous and powdery layers can be formed into soft layers containing a binder, and these layers can then be adhered with rollers and sintered.

In Example 2, when fine powder layers were formed, a slurry of $NiCO_3$ with water as a dispersion medium was applied to the electrodes. Fine Ni particles were precipitated and sintered to form fine powder layers. However, the material for the above is not limited to Ni but may be any material which does not generate a corrosive gas such as $Ni(OH)_2$ or $(CH_3COO)_2Ni$. Furthermore, $NiCO_3$ or $(CH_3COO)_2Ni$ can be decomposed in an oxygen atmosphere, and then a slurry containing NiO can be applied onto the surface of the sintered layers of powdery material. The material need not be limited to Ni alone but may be a carbonate or hydroxide containing Ni and Cr or Co. When such a material is used, it is thermally decomposed to form fine powder layers of Ni-Cr, Ni-Co or Ni-Cr-Co.

What is claimed is:

1. A molten carbonate fuel cell comprising unit cells each having an electrolyte layer in a plate-like form which contains a carbonate melted at an operating temperature, a cathode and an anode which are formed in tight contact to sandwich the electrolyte layer and which respectively comprise plates of porous material, an element for supplying fuel gas to the interface between the cathode and the electrolyte layer through pores in the cathode, and another element for supplying an oxidant gas to the interface between the anode and the electrolyte layer through pores of the anode, characterized in that
each of said cathode and said anode comprises a bilayered structure having a first porous layer which is in contact with said electrolyte layer and a second porous layer which is located at the side of said element for supplying said fuel or oxidant gas and which comprises a sintered layer of a fibrous material, pores in at least a portion of said first porous layer, which is adjacent to said electrolyte layer, have a size capable of capillary action of the molten carbonate and pores of said second porous layer have a size not capable of capillary action of the molten carbonate.

2. A cell according to claim 1, wherein said first porous layer comprises a sintered layer of a fibrous material.

3. A cell according to claim 1, wherein said first porous layer comprises a sintered layer of a powdery material.

4. A cell according to claim 1, wherein the size of the pores of said first porous layer which is capable of capillary action is 0.3 to 20 μm.

5. A cell according to claim 1, wherein said first and second porous layers both have a porosity of 60 to 80%.

6. A cell according to claim 1, wherein a material of said first and second porous layers is at least one member selected from the group consisting of nickel and a nickel alloy containing chromium.

* * * * *